United States Patent [19]

Nash

[11] 4,241,236
[45] Dec. 23, 1980

[54] NOISE RANGE INDICATING SYSTEM

[75] Inventor: Donald H. Nash, Colts Neck, N.J.

[73] Assignee: Bell Telephone Laboratories, Incorporated, Murray Hill, N.J.

[21] Appl. No.: 957,297

[22] Filed: Nov. 2, 1978

[51] Int. Cl.³ ............................................. H04B 9/00
[52] U.S. Cl. .................................. 179/2 EA; 455/296; 455/613
[58] Field of Search .............. 179/1 HF, 2 EA, 1 GN; 250/199; 358/113; 325/65, 403, 473, 478; 455/296, 613

[56] References Cited

U.S. PATENT DOCUMENTS

| 3,927,316 | 12/1975 | Citta .................................... 250/199 |
| 3,999,132 | 12/1976 | Smith ................................ 179/1 GN |
| 4,068,093 | 1/1978 | Fidi .................................. 179/1 GP |
| 4,081,747 | 3/1978 | Meyerle ................................. 325/37 |

FOREIGN PATENT DOCUMENTS 2609283  8/1977  Fed. Rep. of Germany ....... 179/2 EA

OTHER PUBLICATIONS

Phaselock Techniques (John Wiley & Sons, Inc.), Floyd M. Gardner, "Tracking and Acquistion," pp. 52–54, 1966.
Signetics Digital Linear MOS Applications, 1974, "Phase Locked Loop Applications," pp. 6–12, 6–13 and 6–39.
Plessey Semiconductors, "SL600 Series, Radio-communication Circuits," NPD.

Primary Examiner—Bernard Konick
Assistant Examiner—Joseph A. Popek
Attorney, Agent, or Firm—Robert O. Nimtz

[57] ABSTRACT

A hands-free telephone system is disclosed utilizing an infrared transmitter and receiver to permit wireless speech transmission. The transmitter uses frequency modulation imposed on the infrared signal and includes carrier shift signaling arrangements for indicating a low battery condition and transmitter turn-off. The receiver utilizes a noise detection circuit for permitting remote turn-on, for squelching noise in the voice path, and for feeding an alerting signal to a loudspeaker to indicate that the received signal is excessively noisy. The portable transmitter must then be moved or redirected to provide a better line-of-sight signaling path.

10 Claims, 3 Drawing Figures (TRANSMITTER)

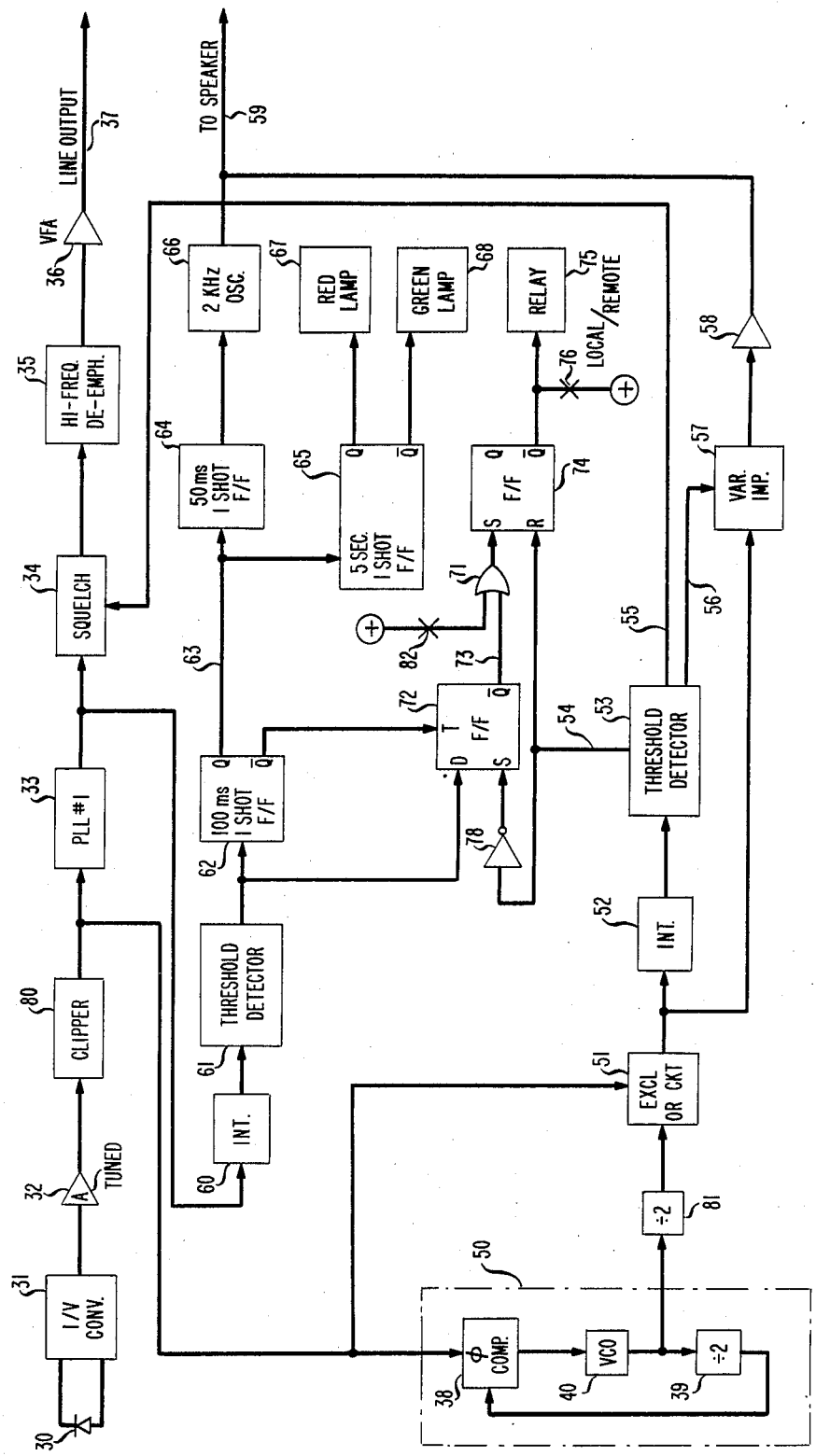
FIG. 3 (RECEIVER)

NOISE RANGE INDICATING SYSTEM

BACKGROUND OF THE INVENTION

1. Field of the Invention

This invention relates to wireless transmission systems and, more particularly, to the use of noise as an alerting signal to indicate a poor transmission path in such a wireless transmission system.

2. Description of the Prior Art

Wireless systems are known for short-range transmission which utilize ratio signals, ultrasonic signals and light signals to transmit voice signals between a wirelesss portable transmitter and a stationary receiver. Ultrasonic and radio transmissions have a distinct disadvantage for telephony, however, due to the lack of privacy engendered by the range and ability of these signals to pass through many common buildings. Signals in the light frequency range, on the other hand, are stopped or severely attenuated by normal building structures and afford a high degree of privacy. In particular, signals in the infrared band are not visible, provide a line-of-sight transmission and are therefore highly suitable for cordless or hands-free telephony.

The highly directional nature of infrared transmission, however, poses a serious problem in maintaining an adequate communication path between a portable transmitter and a stationary receiver. While a large number of spatially distributed receivers alleviates this problem, it does so at a significant cost and with a residual possibility that an adequate transmission path may not exist in spite of the arrangement.

SUMMARY OF THE INVENTION

In accordance with the illustrative embodiment of the present invention, the quality of the transmitted signal itself is used to produce an audible indication to the user of the portable transmitter of the quality of the transmission path. In particular, the signal-to-noise ratio of the received signal is detected and, when the noise becomes excessive, a portion of that noise is amplified and fed to a loudspeaker. This noise signal forces the user of the portable transmitter to change his position sufficiently to improve the transmission path and reduce the noise. Indeed, the proper motion of the user is accomplished at almost a subconscious level in response to such a noise signal. The noise, of course, is not transmitted to the other party to the conversation and serves only as a local alerting signal.

In accordance with one feature of the illustrative embodiment of the present invention, the alerting noise signal is not cut into the audio channel until the noise exceeds some preselected threshold, indicating an inadequate transmission path.

The arrangements of the present invention are also highly suitable for use with portable microphones in a public address system as well as for hands-free telephony.

BRIEF DESCRIPTION OF THE DRAWINGS

FIG. 3 is a detailed block diagram of the receiver used in the telephone station of FIG. 1.

DETAILED DESCRIPTION

Figure 1:
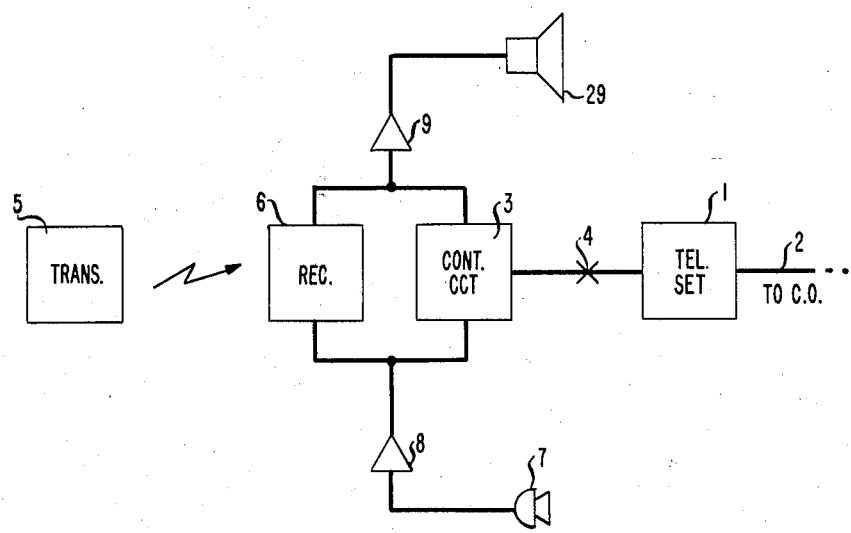
FIG. 1 is a general block diagram of a cordless telephone station in accordance with the present invention.

Referring more particularly to FIG. 1, there is shown a general block diagram of a cordless telephone station set comprising a standard telephone set 1 from which a standard telephone line pair 2 extends to the telephone central office. A control circuit 3 includes a set of manual switches for operating a relay to close relay contacts 4 and connect telephone line 2 through set 1 to control circut 3.

A portable transmitter 5 includes a microphone and an infrared transmitter to transmit voice signals from the user of the portable transmitter to a stationary receiver 6. Receiver 6 recovers the audio signals from the transmitted infrared carrier and transmits these signals through control circuit 3 and telephone set 1 to telephone line 2. Alternatively, signals can be picked up from a stationary microphone 7 after amplification by audio frequency amplifier 8.

Voice signals received via telephone line 2 from a remote party pass through telephone set 1 and control circuit 3, are amplified by amplifier 9 and applied to a loudspeaker 29. In addition, certain alerting signals initiated by transmitter 5 and received by receiver 6 are also applied through amplifier 9 to loudspeaker 29. In particular, receiver 6 can be arranged to detect the noise level in the signal received from transmitter 5 and, when this noise level becomes excessive, to feed a portion of the noise signal through amplifier 9 to loudspeaker 29. The noise can thus serve as an alerting signal to indicate to the person using transmitter 5 that their position must be changed in order to establish a better line-of-sight transmission path to receiver 6.

In other applications, transmitter 5, receiver 6 and loudspeaker 29 may be parts of a public address system. In this case, transmitter 5 serves as a cordless microphone and provides a speaker in a large auditorium with the ability to move around without dragging wires. Again, the noise feedback insures an adequate transmission path from the transmitter to the receiver.

Figure 2:
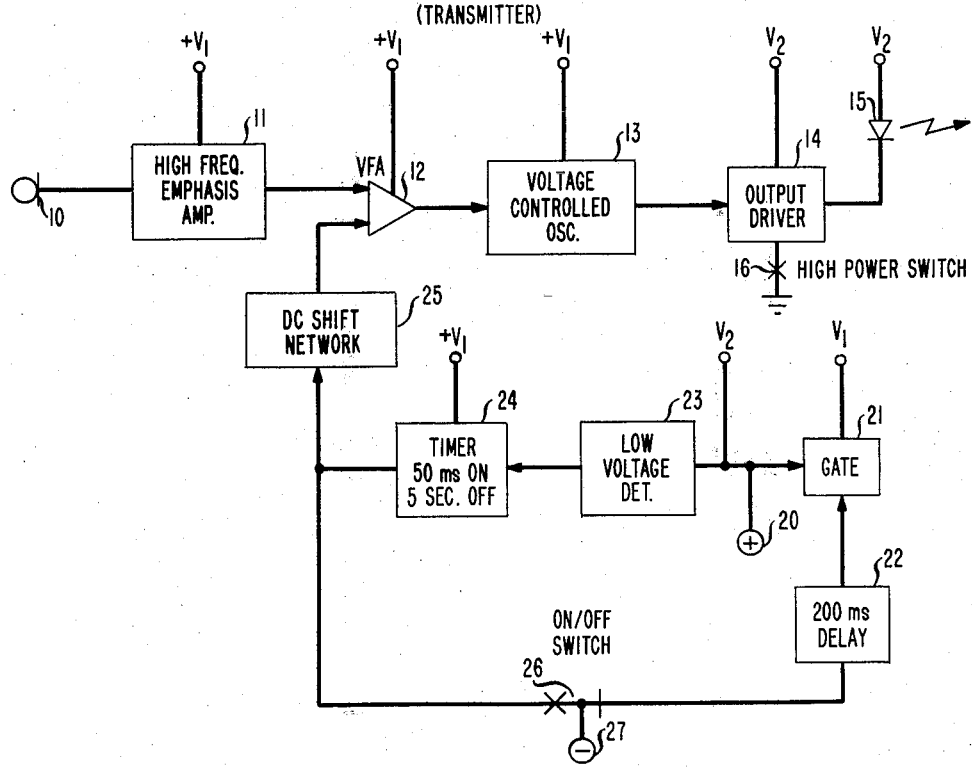
FIG. 2 is a detailed block diagram of the portable transmitter used in the station of FIG. 1.

In FIG. 2 there is shown a detailed block diagram of the portable infrared transmitter 5 of FIG. 1, comprising a standard microphone 10, the output of which is applied to a high frequency emphasis circuit 11. The purpose of circuit 11 is to emphasize the amplitude of the high frequency components of the signal received from microphone 10 in order to improve the signal-to-noise ratio at these higher frequencies. The output of circuit 11 is fed into a voice frequency amplifier 12, the output of which is used to control the frequency of the voltage-controlled oscillator 13. In accordance with usual practice, the output of voice frequency amplifier 12 can be clipped to remove excessive amplitude swings, in either the output of microphone 10 or DC shift circuit 25, which might cause excessive deviations in voltage-controlled oscillator 13. Thus, the output of oscillator 13 is a signal with a nominal (unmodulated) carrier frequency (for example, 100 kHz) which is frequency modulated by the voice frequency signal from microphone 10. This frequency modulated signal is applied to an output driver circuit 14 which provides power amplification of the frequency modulated signal. The output of driver 14 is applied to a light emitting diode (LED) 15 which responds to the frequency modulated signal by emitting modulated electromagnetic radiation in the infrared portion of the frequency spectrum. Although a single LED 15 is shown, a plurality of such LEDs can be connected in parallel or series and driven by output driver 14 in order to increase the spatial dispersion of the infrared signal. A manual switch having contacts 16 is used to increase the power level of the transmitted signal for environments requiring a higher than normal signal strength. Normally, however, contacts 16 remain open, thereby reducing the transmitted power level and conserving battery power.

The portable transmitter of FIG. 2 is powered by a rechargeable battery 20. The upper or positive terminal of battery 20 supplies operating voltage $V_2$ to the output driver 14 and to LED 15. The remaining components of the transmitter of FIG. 1 are supplied by an operating voltage $V_1$ which is derived from battery 20 through a gate circuit 21. Gate 21, in turn, is enabled by the output of delay circuit 22.

The output of battery 20 is monitored by a low voltage detector 23 which produces an output signal, applied to timer 24, when the voltage of battery 20 fails below a preselected threshold, indicating that battery 20 requires recharging. Timer 24 generates a sequence of 50 millisecond pulses separated by 5 second OFF periods. This signal is applied to a direct current level shifting circuit 25, the output of which is added to the voice frequency signal by voice frequency amplifier 12. Thus, during the 50 millisecond ON period of timer 24, the direct current level of the output of voice frequency amplifier 12 shifts by a preselected amount, thereby shifting the frequency oscillator 13. This carrier shift signal is impressed on the infrared beam emitted by LED 15 and is detected at the stationary receiver to indicate the low battery condition.

A manual ON/OFF switch having contacts 26 is used to turn the remote terminal off and on. Assuming the transmitter is in the ON condition and it is desired to turn it off, contacts 26 are operated to connect a selected potential 27, e.g., ground, to the input of direct current shift network 25, thus providing a shift in the frequency of oscillator 13. At the same time, contacts 26 remove the operating voltage from delay circuit 22 which, after a 200-millisecond delay in delay circuit 22, opens gate 21. When gate 21 is opened, operating voltage $V_1$ is removed from emphasis circuit 11, amplifier 12, oscillator 13 and timer 24. When operating voltage $V_1$ is removed from voltage-controlled oscillator 13, bias is removed from output driver 14, leaving driver 14 and LED 15 in a nonconducting state.

It can therefore be seen that, by operating contacts 26, a 200 millisecond frequency shift signal is produced by the transmitter of FIG. 1 after which the major portions of the circuit of FIG. 1 become unpowered. This 200-millisecond pulse is detected at the stationary receiver to indicate that the remote transmitter has been turned off.

In FIG. 3 there is shown a detailed block diagram of the stationary infrared receiver 6 of FIG. 1 and useful with the transmitter of FIG. 2. The receiver of FIG. 3 comprises a reverse biased PIN photodetector diode 30 connected to a current-to-voltage converter 31. The infrared signal transmitted by the LED 15 of FIG. 2 is detected by the photodetector 30 in FIG. 3. A plurality of photodetectors can be connected, in parallel to detector 30, to provide wide angle reception of the infrared signal.

The output of converter 31 is applied to a tuned amplifier 32, tuned to the nominal frequency of the voltage-controlled oscillator 13 of FIG. 2. The output of amplifier 32 is applied to a clipper circuit 80 which removes the amplitude variations in the frequency modulated signal. The output of clipper 80 is applied to a phase-locked loop 33 which, in accordance with well-known techniques, tracks the frequency of the signal from clipper circuit 80 and produces a signal to squelch circuit 34 proportional to the frequency deviation of its input signal, i.e., proportional to the audio modulating signal. Squelch circuit 34 is a fast-acting switch which can be operated to interrupt the audio signal whenever its noise content becomes excessive. The output of squelch circuit 34 is applied to a high frequency deemphasis circuit 35 which removes the nonlinear frequency characteristic introduced by emphasis circuit 11 of FIG. 2. The output of deemphasis circuit 35 is applied through a voice frequency amplifier 36 to output lead 37, connected as shown in FIG. 1 to control circuit 3.

In order to obtain a measure of the noise level in the signal from tuned amplifier 32, the output of clipper 80 is applied to a second phase-locked loop 50 which is constructed to be substantially wider in bandwidth than is phase-locked loop 33. Thus, phase-locked loop 50 tracks the incoming signal much more closely than does phase-locked loop 33.

The output of phase-locked loop 50 is compared to the output signal of clipper 80 in exclusive OR circuit 51, serving as an instantaneous phase comparator. Phase-locked loop 50 comprises a phase comparator 38, a voltage-controlled oscillator (VCO) 40, and a divide-by-two network 39. A commercially available integrated circuit phase-locked loop (such as the Signetics 561B) can be utilized for the phase-locked loop 50. The phase comparator 38 and voltage-controlled oscillator 40 are thus normally incorporated into phase-locked loop 50. Phase-locked loop 50 also includes a divide-by-two network 39, allowing VCO 40 to be operated at twice the frequency of the input signal.

In conventional operation, the output of the voltage-controlled oscillator of a phase-locked loop is 90 degrees ahead of the input signal in phase and at the same frequency. To obtain a signal in-phase with the output of clipper 80, the phase of the output of the VCO of the phase-locked loop 50 must be advanced 90 degrees before it is applied to exclusive OR phase detector 51. Phase shifting is accomplished by using the pair of divide-by-two networks 39 and 81. One network (network 39) is triggered on the leading edge of its input signal, and the other network (network 81) by the trailing edge of the voltage-controlled oscillator output signal. The outputs of the two divided-by-two networks 39 and 81 are therefore 90 degrees out of phase and at one-half the frequency of the voltage-controlled oscillator 40. Since the voltage-controlled oscillator 40 is to be operated at twice the frequency of the incoming signal, when loop 50 is in lock the output of divide-by-two network 39 is leading the input signal by 90 degrees, and the quadrature output of network 81 is in phase with the output of clipper 80. The outputs of the two networks 39 and 81 also have the same frequency as the input signal to phase-locked loop 50 and exclusive OR phase comparator 51.

The output from exclusive OR phase detector 51 indicates whether the two signals are in phase and, if not, determines the amount of phase error present in each cycle. In the absence of noise, the two inputs are exactly in phase and the output of the exclusive OR phase detector 51 is zero. The presence of noise in the input signal, however, causes phase jitter in the output of clipper 80. This phase jitter increases with noise and decreases with signal strength. Since the phase-locked loop 50 cannot track the rapid and random phase jitter induced by noise, the output produces by exclusive phase detector 51 is proportional to the noise in the input signal and increases with an increasing noise-to-signal ratio.

The noise signal from exclusive OR phase detector 51 is integrated by an integrator 52 the output of which is applied to a threshold detector circuit 53. Threshold detector 53 produces output signals on leads 54, 55 and 56 when the output of integrator 52 crosses various thresholds. These thresholds correspond to noise-to-signal ratios present at the input of the clipper 80. When these levels are crossed, various circuits are triggered to perform the following functions: (1) to squelch the audio signal being transmitted to the listener (lead 55), (2) to indicate that the remote portable transmitter has been turned on (lead 54) and (3) to provide feedback to the user of the portable transmitter concerning the quality of the transmitted signal received by the receiver unit (lead 56).

The highest threshold corresponds to the poorest signal-to-noise ratio at the input to the clipper 80 (e.g., $\simeq +2$ dB). When this threshold is crossed, an output on lead 55 is produced which is used to operate squelch circuit 34. At this signal-to-noise ratio, there is serious degradation of the audio signal, and therefore the audio signal is interrupted to prevent this noise from being transmitted to the telephone line 2 (FIG. 1).

The lowest threshold (about $+10$ dB) permits remote turn-on of the receiver unit of FIG. 3 by the portable transmitter of FIG. 2. When the output of the phase detector 51 crosses the lowest threshold of threshold detector 53, lead 54 is energized. The output signal on lead 54 sets flip-flip 74, energizing relay 75, and connecting the receiver unit to the telephone line. In this way, the receiver can be turned on remotely simply by turning on the transmitter.

The output lead 56 of threshold detector 53 is used to vary the impedance of a variable impedance device 57. The threshold level for the lead 56 is crossed when the signal-to-noise ratio at the input to clipper 80 decreases to a mid-range value, for example, below $+6$ dB. As the signal-to-noise ratio deteriorates, the impedance of device 57 decreases, and the attenuation of the noise signal (taken from the output of phase detector 51) decreases. The noise signal applied to the noise amplifier 58 therefore increases with the diminishing attenuation as well as with the increasing noise level in the input signal. Thus, when the input signal-to-noise ratio drops below $+6$ dB, a portion of the noise signal is amplified and fed via line 59 to the loudspeaker 29 (FIG. 1). As the noise level in the received signal increases, the portion of noise transmitted to the loudspeaker increases at a faster than linear rate.

In this way, the level of the noise signal can be used to alert the person using the portable transmitter that the signal being transmitted to the listener is deteriorating. This may occur for any number of reasons: excessive distance between the transmitter and receiver, obstruction of the link between transmitter and receiver, or the proximity of a high level noise source. As the level of noise transmitted to the loudspeaker 29 increases, the user of the portable transmitter is alerted that still further deterioration of the audio signal has occurred and that squelching may be taking place. Hearing this noise signal, the user of the portable transmitter can adjust his position or switch the transmitter to the high power mode (switch 16, FIG. 2) to improve the signal-to-noise ratio at the input to the clipper 80 and therefore improve the audio signal.

The audio output signal from phase-locked loop 33 is also applied to a double integrator 60, responsive to a sustained increase in the dc level of the audio output over the steady state dc level of the phase-locked loop 33 output. The dc level shift is a result of the shift in carrier frequency in the portable transmitter previously described. The audio output has an average value of zero and thus will not be detected by network 60.

The network 60 consists of a pair of integrators and circuitry used to set initial conditions for the integrators. Each integrator is composed of an RC network, integrating at different rates with different RC time constants. The input integrator of network 60 may, for example, have an RC time constant of 47 milliseconds while the output integrator has a time constant of one second. Network 60 is desirable due to the possible existance of a difference in the unmodulated carrier frequency of the portable transmitter and the center or free-running frequency of phase-locked loop 33 in the receiver. This initial difference in frequency generates an unknown voltage offset at the output of phase-locked loop 33, and the steady state output of phase-locked loop 33 will no longer be zero. This voltage offset is absorbed by the input integrator of network 60 and thus does not affect the output of threshold detector 61. The output of network 60 is applied to threshold detector 61 which responds to the desired changes in the dc level of the output of the phase-locked loop 33.

A low battery voltage indication and a turn-off signal are coded as shifts in the unmodulated carrier frequency in the voltage-controlled oscillator 13 of the transmitter (as noted in connection with FIG. 2). The threshold detector 61 detects a dc shift in the output of phase-locked loop 33 which may represent either a low battery voltage signal or a transmitter turn-off signal. To distinguish between these two signals, one-shot multivibrator 62 and flip-flops 72 and 74 are used. Threshold detector 61, responding to a sustained shift in carrier frequency, triggers one-shot multivibrator 62 which produces an output pulse of 100 milliseconds. Flip-flop 72 monitors the state of the threshold detector 61 at the termination of the 100 millisecond output pulse of multivibrator 62.

The presence of a low battery voltage condition at the transmitter is indicated to the user of the portable transmitter by an audio "beep" tone of two kHz lasting 50 milliseconds, presented once every five seconds, and by the continuous illumination of a red lamp. One-shot multivibrators 64 and 65 are both triggered by the termination of the output pulse of one-shot multivibrator 62. The 50 millisecond, two kHz tone burst used as an audio signal to indicate low battery voltage is obtained by the 50 millisecond one-shot multivibrator 64 gating a 2000 Hz oscillator 66, connected via line 59 to the loudspeaker 29 of FIG. 1.

The one-shot multivibrator 65 produces pulses with a 10-second duration when triggered. This 10-second output pulse is used to light a red lamp 67, turning off a green lamp 68 (used to indicate a battery "okay" condition), thus providing the user with a visual as well as with an audible indication of a low battery voltage.

The transmitted low battery signal consists of 50 millisecond shifts in carrier frequency separated by 5 second intervals. The threshold detector 61 responds to the 50 millisecond shifts in transmitted carrier frequency and thus is pulsed at 5 second intervals. Detector 61 therefore triggers all the one-shot multivibrators (62, 64 and 65) once every five seconds. A 50 millisecond tone burst of two kHz is presented to the user every five seconds by gating multivibrator 64 with the two kHz oscillator 66. Since one-shot multivibrator 65 is retriggerable, repeated applications of a triggering signal within 10 seconds of the previous triggering signal will merely sustain the output state. Since the pulse width output of one-shot multivibrator 65 is 10 seconds and low battery voltage triggering signals occurring once every five seconds, the multivibrator output will not change once a low battery voltage signal has been detected by the receiver.

When a turn-off or low battery signal is transmitted, the output of threshold detector 61 changes to its low state for 200 milliseconds, or for 50 milliseconds, respectively. One-shot multivibrator 62 is triggered, thus producing a 100-millisecond pulse at its output. At the end of this pulse the signal at the "D" input of flip-flop 72 will be clocked into flip-flop 72. If a low battery indication is transmitted, this signal will be a ONE because the output of threshold detector 61 is high at this time. The state of flip-flop 72 remains unchanged and the receiver remains ON. However, should a turn-off signal be transmitted, the output of threshold detector 61 is still low when the signal from one-shot 62 occurs and the $\overline{Q}$ output of flip-flop 72 is changed from a low to a high level. The change in the $\overline{Q}$ output of flip-flop 72 then resets flip-flop 74, releasing relay 75. At the end of the turn-off signal, the transmitter is depowered and the carrier terminated. At this time, the output on lead 54 of threshold detector 53 goes low, thus setting flip-flop 72. Setting flip-flop 72 removes the reset signal from flip-flop 74. Flip-flop 74 is now prepared to accept another turn-on signal from output lead 54 of threshold detector 53 when it appears.

The receiver of FIG. 3 can also be turned off by manual contacts 82. Operating contacts 82 puts a high signal into the OR gate 71 which resets flip-flop 74 and releases relay 75.

It can be seen that the transmitter of FIG. 2 and the receiver of FIG. 3 cooperate to provide an infrared transmission link between a portable transmitter (FIG. 2) and a stationary receiver (FIG. 3), as shown in FIG. 1. Furthermore, the portable transmitter utilizes frequency shift techniques to signal the stationary receiver of a plurality of conditions. In the first case, a low battery signal is represented by short but recurrent frequency shifts in the transmitted signal. The portable transmitter "turn off" signal is represented by a single, much longer frequency shift in the transmitted signal. It is clear that diffrent length pulses or frequency shifts in other combinations could be used to signal other conditions from the remote, portable transmitter to the stationary receiver.

It will also be noted that noise is detected in the received signal by comparing phases between the input and the output of a tightly locked phase-locked loop. Phase discrepancies between these signals represent phase jitter introduced due to the noise mixed with the signal. Indeed, the amount of jitter is substantially proportional to the amount of noise and can therefore be used as an indicator of the noise level.

One way to use this noise signal is to feed a portion of the noise signal to the stationary loudspeaker to make the use of the remote, portable transmitter aware of the high noise content in the received signal. The person using the remote transmitter can therefore move, or turn the power level switch to HIGH, so as to reduce this noise indication and thus improve the signal-to-noise ratio received at the stationary receiver.

I claim:

1. A wireless audio transmission system for use within an enclosed space and including a portable wireless transmitter, a stationary receiver, and a loudspeaker, CHARACTERIZED BY
   a noise detector in said receiver for detecting the noise level in signals transmitted from said transmitter to said receiver, and
   a noise enhancement circuit for applying at least a portion of said noise to said loudspeaker wherein said noise is supplied from said noise detector to said noise enhancement circuit.

2. The wireless transmission system according to claim 1 further CHARACTERIZED BY
   said transmitter and said receiver being adapted to operate in the infrared frequency range.

3. The wireless transmission system according to claim 1 further CHARACTERIZED BY
   control circuits (3) for interconnecting said transmission system with a telephone line.

4. The wireless transmission system according to claim 1 wherein said noise enhancement circuit is CHARACTERIZED BY
   a noise amplifier,
   a variable impedance,
   means connecting the output of said noise detector through said variable impedance and said noise amplifier to said loudspeaker, and
   means responsive to the output of said noise detector for varying said variable impedance.

5. The wireless transmission system according to claim 4 wherein said varying means is CHARACTERIZED BY
   a threshold detector for setting a noise level threshold above which said noise signal is enhanced.

6. A hands-free telephone station system comprising
   a portable transmitter for wireless transmission,
   a stationary receiver connectable to a telephone line,
   a loudspeaker,
   a noise detector responsive to the noise level in signals received from said transmitter, and
   noise connecting means responsive to said detector for applying a portion of said noise to said loudspeaker wherein said noise is supplied from said noise detector to said noise enhancement circuit.

7. The hands-free telephone station system according to claim 6 wherein said transmitter and said receiver include, respectively, means for transmitting and receiving signals in the infrared frequency range.

8. The hands-free telephone station system according to claim 6 further including
   a telephone line, and
   means for selectively connecting said receiver and said loudspeaker to said telephone line.

9. The hands-free telephone station system according to claim 6 wherein said noise connecting means comprises
   a noise amplifier,
   a variable impedance,
   means connecting the output of said noise detector through said variable impedance and said noise amplifier to said loudspeaker, and
   means responsive to the output of said noise detector for varying said variable impedance.

10. The hands-free telephone station system according to claim 9 further including
    a threshold level detector responsive to said noise detector output to enable said variable impedance only above a preselected threshold.

* * * * *

UNITED STATES PATENT AND TRADEMARK OFFICE
CERTIFICATE OF CORRECTION

PATENT NO. : 4,241,236
DATED : December 23, 1980
INVENTOR(S) : Donald H. Nash

It is certified that error appears in the above—identified patent and that said Letters Patent is hereby corrected as shown below:

```
Column 1, line 13, "ratio" should read --radio--.
Column 2, line 10, "circut" should read --circuit--.
Column 3, line 18 "fails" should read --falls--;
line 28 after "frequency" insert --of--.
Column 5, line 3, "produces" should read --produced--.
Column 7, line 65, "use" should read --user--.
```

Signed and Sealed this

Nineteenth Day of May 1981

[SEAL]

Attest:

RENE D. TEGTMEYER

*Attesting Officer*   *Acting Commissioner of Patents and Trademarks*